US012104417B2

(12) United States Patent
Chen et al.

(10) Patent No.: US 12,104,417 B2
(45) Date of Patent: Oct. 1, 2024

(54) ROTARY DOOR STOP

(71) Applicant: Ningbo Eudemon Child Protective Equipment Co., Ltd., Ningbo (CN)

(72) Inventors: Yingfeng Chen, Ningbo (CN); Zhen Zhang, Ningbo (CN)

(73) Assignee: Ningbo Eudemon Child Protective Equipment Co., Ltd., Ningbo (CN)

( * ) Notice: Subject to any disclaimer, the term of this patent is extended or adjusted under 35 U.S.C. 154(b) by 0 days.

(21) Appl. No.: 17/982,548

(22) Filed: Nov. 8, 2022

(65) Prior Publication Data

US 2023/0068935 A1 Mar. 2, 2023

(30) Foreign Application Priority Data

Jul. 29, 2022 (CN) ......................... 202222027197.0

(51) Int. Cl.

| | |
|---|---|
| ***E05C 17/00*** | (2006.01) |
| ***E05C 17/08*** | (2006.01) |
| ***E05F 5/02*** | (2006.01) |
| ***E05F 5/04*** | (2006.01) |

(52) U.S. Cl.

CPC ............ *E05C 17/025* (2013.01); *E05C 17/08* (2013.01); *E05F 5/02* (2013.01); *E05F 5/04* (2013.01); *E05F 2005/046* (2013.01)

(58) Field of Classification Search

CPC ...... E05C 17/025; E05C 17/443; E05C 17/08; E05C 17/04; E05C 17/045; E05C 17/047; E05C 17/085; E05C 17/12; E05C 17/44; E05C 17/46; E05C 17/50; E05C 17/54; E05C 19/18; E05C 19/182; E05C 19/188; E05F 5/02; E05F 5/022; E05F 5/025; E05F 5/027; E05F 5/04; E05F 2005/043; E05F 2005/046; E05B 17/005

USPC .......................................................... 292/288

See application file for complete search history.

(56) References Cited

U.S. PATENT DOCUMENTS

| | | | | |
|---|---|---|---|---|
| 3,055,043 | A * | 9/1962 | Luttner, Jr. | E05F 5/04 292/87 |
| 4,261,140 | A * | 4/1981 | McLean | E06B 7/36 16/83 |
| 4,982,474 | A * | 1/1991 | Kjellstrom | E05C 17/04 16/83 |
| 5,123,685 | A * | 6/1992 | Donovan | E05C 17/04 16/86 A |
| D346,109 | S * | 4/1994 | Comaianni | D8/402 |
| 5,369,840 | A * | 12/1994 | Salvador | E05C 17/54 16/83 |
| 6,327,743 | B1 * | 12/2001 | Rashid | E05C 17/04 16/86 A |

(Continued)

FOREIGN PATENT DOCUMENTS

CN 221096194 U * 6/2024

*Primary Examiner* — Jeffrey O'Brien

(57) ABSTRACT

The present disclosure provides a rotary door stop. The rotary door stop includes a door stop rotation base and a door stop body. The door stop body rotates about the door stop rotation base to define a locked state or an unlocked state. By engagement between a first limiting portion and a second limiting portion, the rotary door stop is retained in the locked state for ease of door closing; and when the rotary door stop approaches a door frame, retention of the unlocked state may also be released while the door is closed.

12 Claims, 6 Drawing Sheets

(56) References Cited

U.S. PATENT DOCUMENTS

| | | | | |
|---|---|---|---|---|
| 6,487,751 | B2 * | 12/2002 | Renaud | E05F 5/04 16/83 |
| 6,510,587 | B2 * | 1/2003 | Urschel | E05F 5/02 16/83 |
| 6,550,186 | B2 * | 4/2003 | Haq | E06B 7/36 16/83 |
| 8,595,899 | B2 * | 12/2013 | McRoskey | E05F 5/04 16/83 |
| 9,976,325 | B2 * | 5/2018 | Zolman | E05C 3/044 |
| 10,094,158 | B2 * | 10/2018 | McRoskey | E05F 5/06 |
| 10,450,787 | B1 * | 10/2019 | Jaffee | E05F 5/04 |
| 10,822,854 | B2 * | 11/2020 | Lee | E05C 19/188 |
| 11,149,484 | B1 * | 10/2021 | Bouzianis | E05F 5/02 |
| 2005/0241238 | A1 * | 11/2005 | Garvey | E05F 5/04 49/383 |
| 2009/0058104 | A1 * | 3/2009 | Huang | E05C 17/00 292/288 |
| 2011/0154610 | A1 * | 6/2011 | Sanz | E05F 5/04 16/82 |
| 2012/0042590 | A1 * | 2/2012 | Ben-David Yosef | E05F 5/04 49/70 |
| 2014/0259523 | A1 | 9/2014 | Karcher | |
| 2018/0334842 | A1 | 11/2018 | Burshtain | |
| 2020/0263472 | A1 * | 8/2020 | Pruja | E05C 17/50 |
| 2022/0042358 | A1 | 2/2022 | Gordon | |
| 2024/0018817 | A1 * | 1/2024 | Yun | E05C 17/045 |

* cited by examiner

ROTARY DOOR STOP

TECHNICAL FIELD

The present invention relates to the field of protection apparatuses, and in particular, relates to a rotary door stop.

BACKGROUND

In everyday life, doors may be closed by wind or opened or closed by children or pets playing in and out, which may cause adverse effects such as noise or finger pinch. A door stop for preventing closing of the door is thus provided in the form of a clamp, a hook, a wedge, or the like.

A rotary door stop, which is more convenient to use than the other door stops described above, may be rotated after being secured to the door, such that the rotary door stop is partially protruded between a door body and a door frame to stop closing of the door, or may be rotated to an inner side of an edge of the door body so as not to affect closing of the door.

However, conventional rotary door stops generally require manual operations by users and are not convenient to use. For example, CN204609590U has disclosed a safety door stop, CN206917572U has disclosed a child safety door stop, and CN212079135U has disclosed a child anti-pinch door stop. These prior patents have all disclosed a rotary door stop.

SUMMARY

The present disclosure is intended to provide a rotary door stop which is convenient to use and capable of switching between a stop state and a non-stop state.

According to a first aspect of the present disclosure, a rotary door stop is provided. The rotary door stop includes:

a door stop rotation base configured to be fixed to a door body or a door frame;

a door stop body rotatably engaged with the door stop rotation base, the door stop body including a rotation base end and a stop arm, the rotation base end being rotatably engaged onto the door stop rotation base; wherein the stop arm is configured to rotate about the door stop rotation base to between the door body and the door frame to achieve a stop effect to define a locked state, or is configured to rotate about the door stop rotation base to a non-stop position to define an unlocked state;

a rotation resetting member arranged between the door stop body and the door stop rotation base; and a first locking portion, and a first operating member provided with a third locking portion engaged with the first locking portion;

wherein one of the first locking portion and the first operating member is arranged on the door stop rotation base, and the other of the first locking portion and the first operating member is arranged on the door stop body; the first locking portion and the third locking portion are respectively provided with a first limiting portion and the second limiting portion, the first limiting portion and the second limiting portion being engaged with each other to limit rotation of the door stop body relative to the door stop rotation base, such that the door stop body is retained in the unlocked state; and wherein the first operating member is arranged close to the door frame to cause the first operating member to act on the door frame when the door body is in a closed state, so as to release limit retention between the first limiting portion and the second limiting portion, such that when the door body is opened, the door stop body is capable of automatically rotating to a lock position under the action of the rotation resetting member.

According to a second aspect of the present disclosure, a rotary door stop is provided. The rotary door stop includes:

a door stop rotation base configured to be fixed to a door body or a door frame;

a door stop body rotatably engaged with the door stop rotation base, the door stop body including a rotation base end and a stop arm, the rotation base end being rotatably engaged onto the door stop rotation base; wherein the stop arm is configured to rotate about the door stop rotation base to between the door body and the door frame to achieve a stop effect to define a locked state, or is configured to rotate about the door stop rotation base to a non-stop position to define an unlocked state;

a first locking portion, and a first operating member provided with a third locking portion engaged with the first locking portion;

wherein one of the first locking portion and the first operating member is arranged on the door stop rotation base, and the other of the first locking portion and the first operating member is arranged on the door stop body; and wherein one of the first locking portion and the third locking portion is provided with a first limiting portion, and the other of the first locking portion and the third locking portion is provided with a second limiting portion, the first limiting portion or the second limiting portion is a limiting planar surface, the first limiting portion and the second limiting portion being engaged with each other to limit rotation of the door stop body relative to the door stop rotation base, such that the door stop body is retained in the unlocked state.

The rotary door stop according to the present disclosure achieves the following beneficial effects:

1. The rotary door stop is convenient to use, and the rotary door stop is switchable between the locked state and the unlocked state by rotation of the door stop body. In addition, the operating member may be arranged on the rotatably arranged door stop body, or may be arranged on the fixedly arranged door stop rotation base.

2. By correspondingly arranging the rotation limiting mechanisms, the door stop body may be limited and retained to the unlocked state, such that when the user closes the door body, the user does not need to operate door body while operating the rotary door stop, but only needs to first rotate the rotary door stop to the unlocked position and then close the door body.

3. In a preferred embodiment, the rotary door stop also has the automatic unlocking function. That is, after the door body is closed, since the door frame and the first operating member acts on each other, limit of the rotary door stop at the unlocked position is released; and when the door body is opened again, the door stop body is capable of automatically rotating to the locked state, thereby implementing a convenient operation for door closing at a single time.

4. In a preferred embodiment, the rotary door stop also has the constant opening function. That is, by adjusting the second operating member, the door stop body is long-time retained at the unlocked position, such that the door body can be freely opened or closed without being influenced by the rotary door stop. Where the function of the rotary door stop is implemented, the function is restored only by releasing the second operating member. Therefore, the use is convenient.

5. In other embodiments, unlocking of the rotary door stop at the unlocked position is manually implemented. That is, the door stop body is first rotated to the unlocked position, and after the door body is closed, the rotary door stop is retained in the unlocked state; after the door body is opened, the first operating member or the second operating member is operated to release limit of the door stop body to cause the door stop body to rotate to the locked state (or limit of the door stop body is first released, and then the door body is closed).

6. In a simple embodiment, the rotary door stop may be retained in an intention of rotating to the locked state, and where the door is to be closed, the rotary door stop is manually rotated to the unlocked position and retained in the unlocked state, and then the door is closed.

DESCRIPTION OF THE EMBODIMENT

A rotary door stop 200 is configured to be mounted on a door body or a door frame, to extend out of the door body or the door frame to prevent the door body from being closed. Hereinafter, description is given using a scenario where the rotary door stop 200 is mounted on a surface of the door body.

First Embodiment

Figure 1:
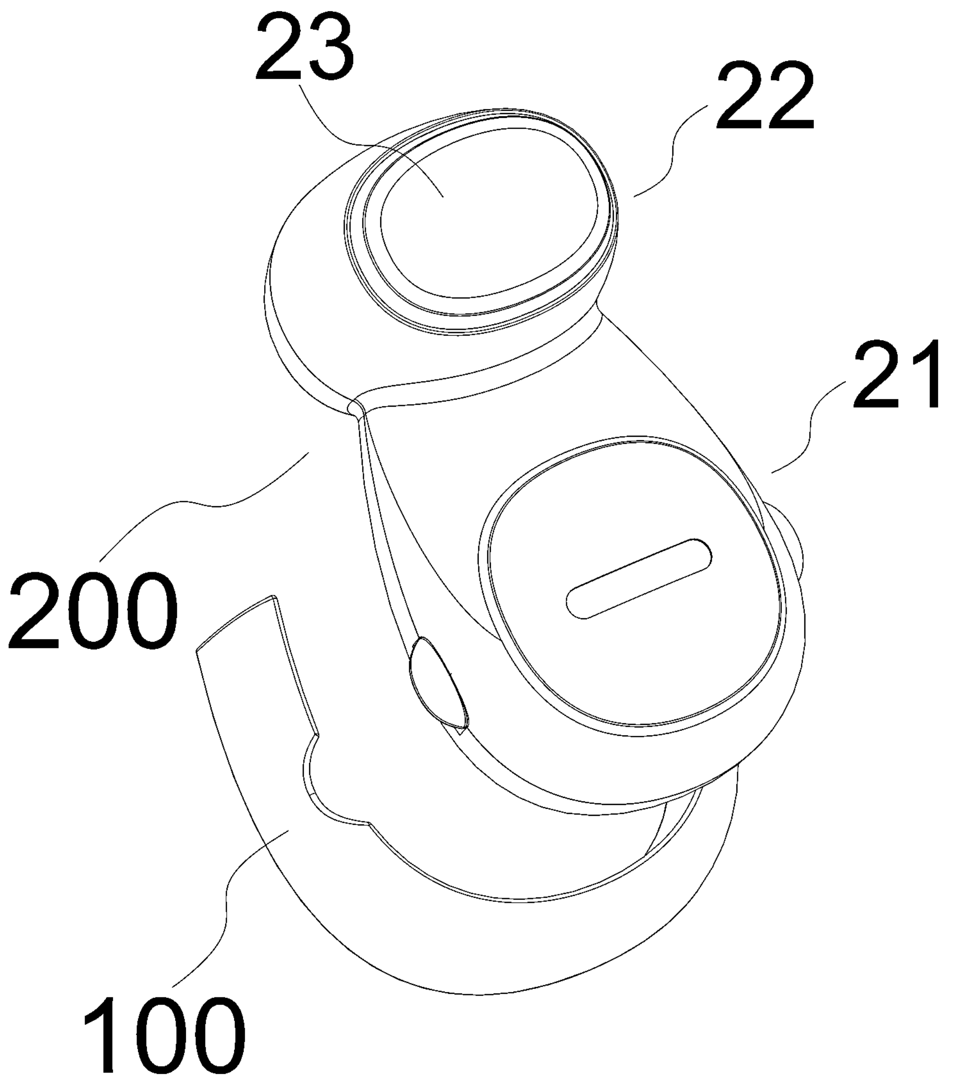
FIG. 1 is a schematic view of engagement between a rotary door stop and a mounting assisting member according to a first embodiment of the present disclosure.

As illustrated in FIG. 1, the rotary door stop 200 includes a rotation base end 21 rotatably secured to the door body. The rotary door stop 200 is elongated such that a stop arm 22 is formed at a position away from the rotation base end 21. During use, the stop arm 22 is capable of rotating about the rotation base end 21 to between the door body and the door frame to achieve a stop effect, or the stop arm 22 is removed between the door body and the door frame to allow the door body to be closed.

In this embodiment, the rotary door stop 200 is entirely elongated, one end of the rotary door stop 200 is formed as the rotation base end 21, and the other end of the rotary door stop 200 is formed as the stop arm 22. A bottom surface of the rotary door stop 200 is arranged close to the surface of the door body, and a top surface of the rotary door stop 200 is configured to be in contact with the door frame to achieve a stop effect.

As illustrated in FIG. 1, a buffering portion 23 is formed at the stop arm 22 on the top surface of the rotary door stop 200. The buffering portion 23 is made of a soft rubber or the like flexible materials, such that a buffering effect is achieved when the buffering portion 23 is in contact with the door frame. In this way, the door frame is prevented from being damaged, and noise generation is prevented.

In this embodiment, configuration of the rotary door stop 200 is not limited to that illustrated in FIG. 1. The configuration of the rotary door stop 200 may be designed according to actual needs on the premise of allowing rotation to prevent door closing or allow door closing.

Figure 2:
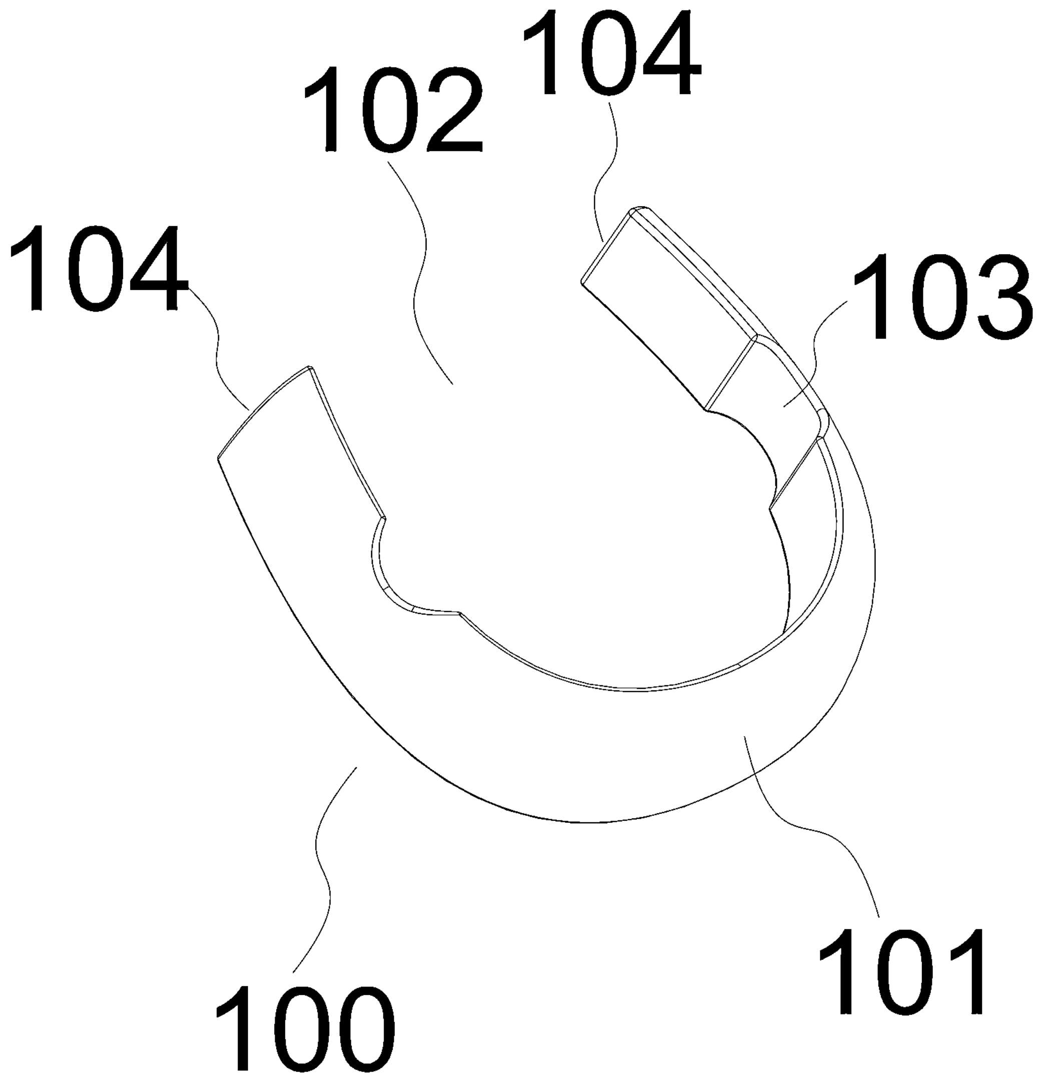
FIG. 2 is a schematic structural view of the mounting assisting member according to the embodiment as illustrated in FIG. 1.

As illustrated in FIG. 1 and FIG. 2, the rotary door stop 200 according to this embodiment further includes a mounting assisting member 100 configured to secure the rotary door stop 200 to the surface of the door body. The mounting assisting member 100 includes a mounting assisting member body 101. A mounting positioning slot 102 configured to allow at least part of the rotary door stop 200 to be engaged therein is formed in the mounting assisting member body 101, and an operating member positioning slot 103 is further arranged in the mounting assisting member body 101. The mounting assisting member 100 is positioned in advance on the door body, then the rotary door stop 200 is positioned and secured in the mounting assisting member 100, and finally the mounting assisting member 100 is removed, such that mounting and positioning of the rotary door stop 200 are conveniently achieved. This is particularly important in the rotary door stop having an automatic unlocking function. Since locking needs to be automatically released for the rotary door stop 200 having the automatic unlocking function, stricter requirements are imposed on positioning in mounting.

In this embodiment, two ends of the mounting assisting member body 101 are formed as positioning ends 104. During assisting of mounting, in the case that the door body is closed, the mounting assisting member body 101 is attached on the surface of the door body and the positioning ends 104 at the two ends of the mounting assisting member body 101 are caused to abut against the door frame; then the door body is opened, and the rotary door stop 200 is positioned and mounted in the mounting positioning slot 102; and finally; the mounting assisting member 100 is removed.

As illustrated in FIG. 3 to FIG. 8, the rotary door stop 200 includes a door stop rotation base 210 and a door stop body 220 rotatably engaged with the door stop rotation base 210. The door stop rotation base 210 is secured to the door body, for example, by an adhesive or a screw, such that the door stop body 220 is rotatably arranged relative to the door body. It should be noted that in a direction perpendicular to the surface of the door body, the door stop body 220 and the door stop rotation base 210 are relatively fixed, that is, the door stop body 220 is arranged as being only capable of rotating along a plane direction relative to the door stop rotation base.

In this embodiment, a rotation angle of the door stop body 220 relative to the door stop rotation base 210 is approximately 90 degrees, such that when the door stop body 220 rotates to a horizontal position, the door stop body 220 extends out between the door body and the door frame to achieve a stop effect, and when the door stop body 220 rotates counterclockwise or clockwise at an angle of 90 degrees to a vertical position, the door stop body 220 is on an inner side of an edge of the door body such that closing of the door body is not stopped.

When the door stop body 220 rotates to the horizontal position, the door stop body 220 stops closing of the door body and thus defines a locked position (a locked state); and when the door stop body 220 rotates to the vertical position, the door stop body 220 allows closing of the door body and thus define an unlocked position (an unlocked state).

In this embodiment, the stop arm 22 and the buffering portion 23 are both formed on the door stop body 220. In addition, a rotation base slot 204 that is recessed is arranged on a bottom surface of the door stop body 220. The rotation base slot 204 is configured to allow the door stop rotation base 210 to be engaged therein, such that the bottom surface of the rotary door stop 200 formed by the door stop body 220 and the door stop rotation base 210 is approximately a planar surface. In this way, the door stop body 220 is capable of stably rotating on the surface of the door body.

Figure 4:
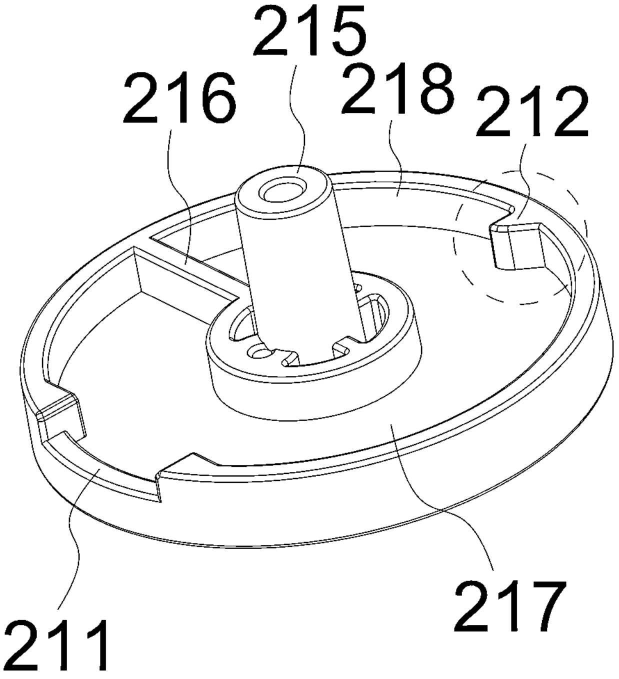
FIG. 4 is a schematic structural view of a door stop rotation base in FIG. 3.
Figure 6:
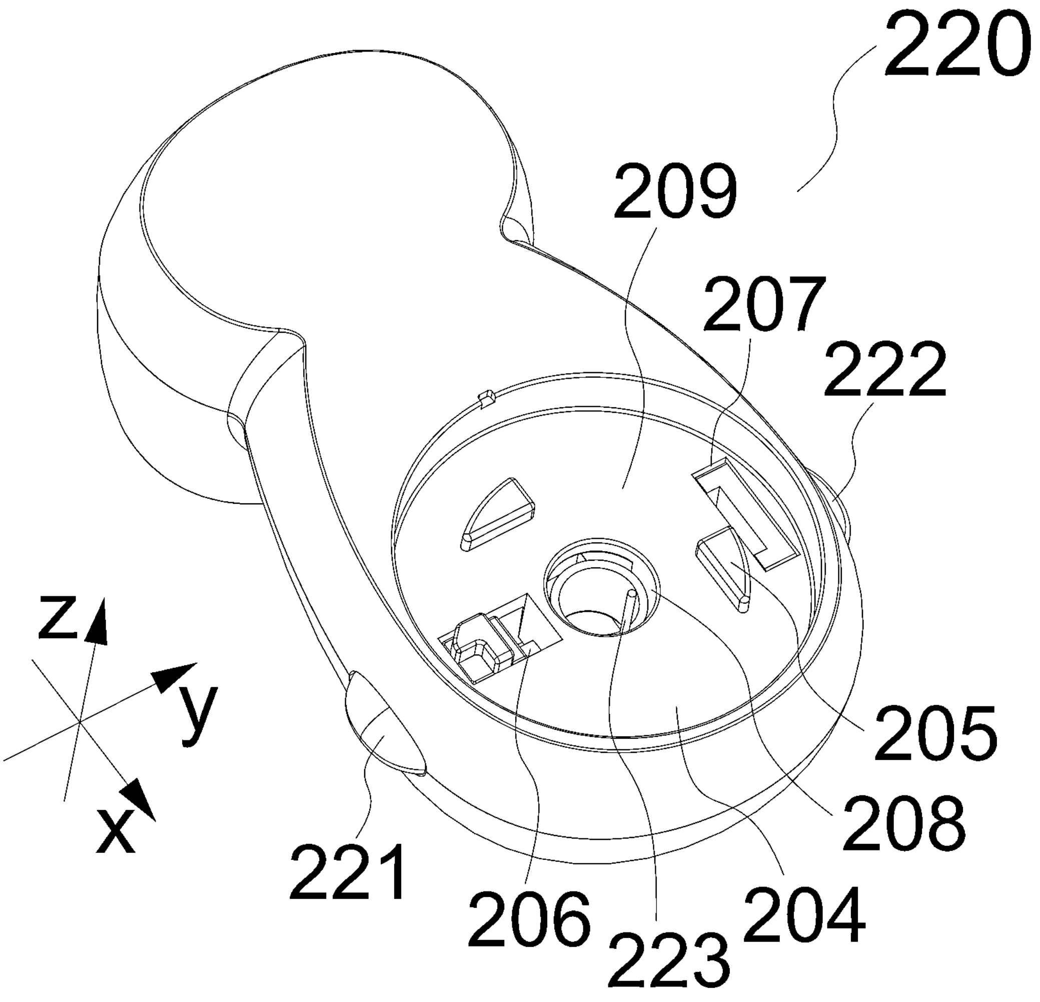
FIG. 6 is a schematic structural bottom view of a door stop body in FIG. 3.

As illustrated in FIG. 4, the door stop rotation base 210 is provided with a first rotation limiting member 216 that is radially arranged. As illustrated in FIG. 6, two rotation limiting members 205 are arranged in the rotation base slot 204, and an angle of 90 degrees is defined between the two rotation limiting members 205 in a circumferential direction. When the door stop rotation base 210 is engaged in the rotation base slot 204, the first rotation limiting member 216 is in a rotation fan region 209 formed between the two rotation limiting members 205, such that the door stop body 220 has a rotation angle of 90 degrees relative to the door stop rotation base 210.

Nevertheless, in other embodiments, by changing a relative positional relationship between the two rotation limiting members 205, the rotation angle of the door stop body 220 relative to the door stop rotation base 210 may be any other desired angle value.

Figure 3:
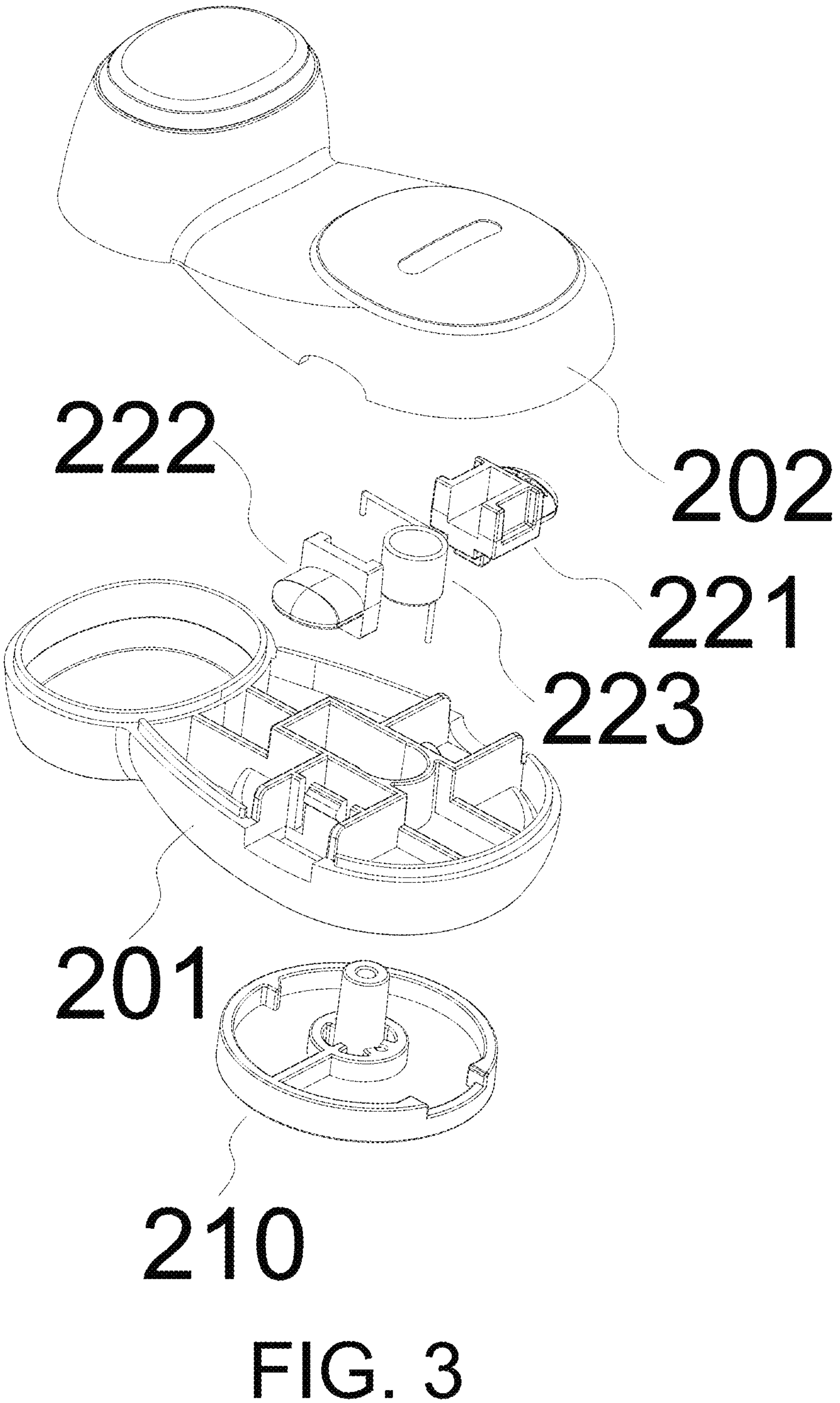
FIG. 3 is a schematic exploded structural view of the rotary door stop according to the embodiment as illustrated in FIG. 1.

As illustrated in FIG. 3, in this embodiment, the door stop body 220 includes a first body member 201 and a second body member 202 that are arranged in a vertical direction. The first body member and the second body member are engaged with each other to form the door stop body 220.

A first operating member 221 and a second operating member 222 are arranged between the first body member 201 and the second body member 202. The first operating member 221 and the second operating member 222 are configured to be engaged onto the door stop rotation base 210 to control the door stop body 220 to rotate or to be locked relative to the door stop rotation base 210.

In this embodiment, the door stop body 220 further includes a resetting torsion spring 223. The resetting torsion spring 223 is arranged between the door stop rotation base 210 and the door stop body 220, such that the door stop body 220 is capable of spontaneously rotating from the unlocked position to the locked position.

As illustrated in FIG. 4, the door stop rotation base 210 includes a circular rotation base body. A bottom surface of the circular rotation base body is secured to the door body. A second locking portion 211 and a first locking portion 212 are arranged on an upper surface of the rotation base body. In this embodiment, the second locking portion 211 and the first locking portion 212 are at radially opposite positions, that is, the two locking portions are arranged at an angle of 180 degrees. A central post 215 is protruded from a center of the rotation base body. A torsion spring mounting hole configured to receive the resetting torsion spring 223 is arranged in a periphery of the central post 215. The resetting torsion spring 223 is sleeved on the periphery of the central post 215, and one end of the resetting torsion spring 223 is engaged in the torsion spring mounting hole, and the other end of the resetting torsion spring 223 acts on the first body member 201 to achieve automatic resetting.

As illustrated in FIG. 4, the rotation base body is further provided with a rotation base slot 217 configured to allow the second rotation limiting member 205 to be engaged therein. An inner wall of the rotation base slot 217 is formed as a rotation base slot wall 218.

As illustrated in FIG. 6, the rotation base slot 204 is further provided with a first through hole 206 opposite to the first locking portion 212 and a second through hole 207 opposite to the second locking portion 211. The first operating member 221 and the second operating member 222 are respectively engaged at the first through hole 206 and the second through hole 207. The first operating member 221 is provided with a third locking portion 313 engaged with the first locking portion 212, and the second operating member 222 is provided with a fourth locking portion 301 engaged with the second locking portion 211. A central through hole 208 configured to allow engagement of the central post 215 is arranged at a center position of the rotation base slot 204.

In this embodiment, the second locking portion 211 is a locking recess, the fourth locking portion 301 is a locking protrusion, and the second locking portion 211 and the fourth locking portion 301 are engaged with each other to limit the door stop body.

The first operating member 221 is configured to lock the door stop body 220 to the unlocked position by engagement between the third locking portion 313 and the first locking portion 212 when the door stop body 220 rotates to the unlocked position. The second operating member 222 is configured to lock the door stop body 220 to the unlocked position by engagement between the fourth locking portion 301 and the second locking portion 211 when the door stop body 220 rotates to the unlocked position. The second operating member 222 is formed as a constantly-opened lock, and the first operating member 221 is formed as an automatic lock.

In this embodiment, the first operating member 221 and the first locking portion 212 are engaged with each other to form a first rotation limiting mechanism, and the second operating member 222 and the second locking portion 211 are engaged with each other to form a second rotation limiting mechanism. The two rotation limiting mechanisms are configured to temporarily and long-time limit and lock the door stop body 220, such that the door stop body 220 is temporarily or long-time in the unlocked state.

Figure 7:
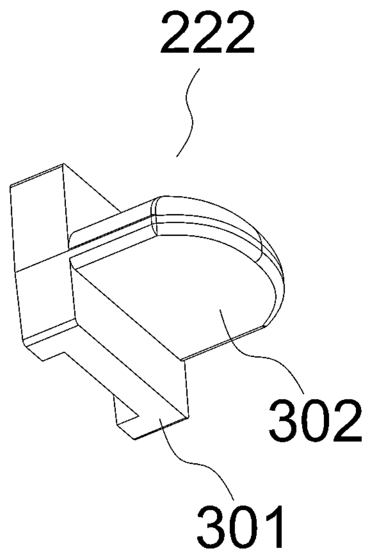
FIG. 7 is a schematic structural view of a second operating member in FIG. 6.

As illustrated in FIG. 6 and FIG. 7, the second operating member 222 is movably arranged in the door stop body 220 along a direction of a Z axis. When the second operating member 222 is displaced along a positive direction of the Z axis, the fourth locking portion 301 runs through the second through hole 207 and then extends into the rotation base slot 204, such that the fourth locking portion 301 is engaged into the second locking portion 211 to lock rotation of the door stop body 220 relative to the door stop rotation base 210 by male-female engagement between the fourth locking portion 301 and the second locking portion 211, and thus to retain the door stop body 220 to the unlocked position. In this way; the rotary door stop is constantly opened. A second key 302 exposed from the door stop body 220 is formed at an outer end of the second operating member 222 for ease of operation.

In this embodiment, a slot is formed an upper surface of the rotation base body only on the second locking portion 211. Therefore, at other positions other than this position, the second operating member 222 is incapable of moving along the direction of the Z axis, or the second operating member 222 is capable of moving but a movement stoke is not sufficient to form a constantly opened state.

Figure 5:
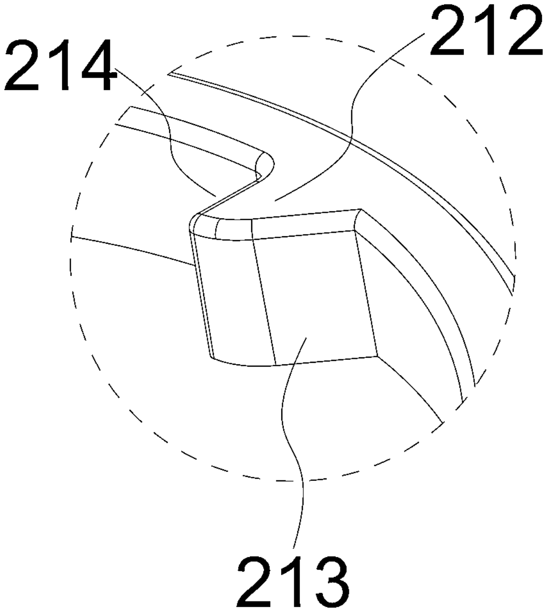
FIG. 5 is a schematic partial enlarged view of the door stop rotation base in FIG. 4.

As illustrated in FIG. 4 and FIG. 5, the first locking portion 212 includes a first guiding portion 213 and a first limiting portion 214. The first guiding portion 213 is a limiting planar surface, and the first limiting portion 214 is a guiding curved surface.

Figure 8:
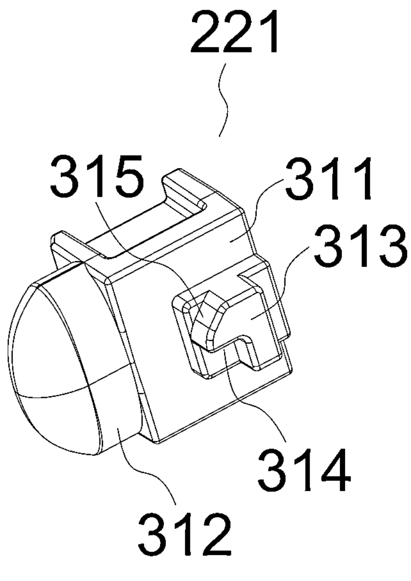
FIG. 8 is a schematic structural view of a first operating member in FIG. 6.

As illustrated in FIG. 6 and FIG. 8, the second operating member 222 includes a second operating member body 311. An outer end of the second operating member body 311 is formed as a first key 312 exposed from the door stop body 220, and a third locking portion 313 is protruded from a lower surface of the second operating member body 311. The third locking portion 313 includes a second limiting portion 314 and a second guiding portion 315. The second limiting portion 314 is a limiting planar surface engaged with the first guiding portion 213, and the second guiding portion 315 is a guiding curved surface engaged with the first limiting portion 214.

In this embodiment, an operation resetting member, for example, a resetting spring, is arranged between the first operating member 221 and the door stop body 220, such that the first operating member 221 retains an extending intention with respect to the door stop body 220 along a negative direction of a Y axis.

When the door stop body 220 rotates from the locked position relative to the door stop rotation base 210, the third locking portion 313 rotates along the rotation base slot wall 218. When the third locking portion 313 approaches the unlocked position, the first limiting portion 214 and the second guiding portion 315 act on each other, such that the first operating member 221 retracts along the Y axis. In this way, the second limiting portion 314 and the second guiding portion 315 are automatically engaged with each other to achieve limiting, such that the door stop body 220 is locked in the unlocked state relative to the door stop rotation base 210.

In this embodiment, the first operating member 221 is arranged on a right side (or a left side) of the door stop body 220, such that when the door stop body 220 is mounted close to the door frame, in the case that the door stop body 220 is in the unlocked state to cause the door to be closed, the first operating member 221 is acted by the door frame to retract and displace inwards along a positive direction of the Y axis, such that the limit effect between the second limiting portion 314 and the first limiting portion 214 is released. When a user opens the door body, the door stop body 220 is capable of automatically rotating to the locked state under the effect of the resetting torsion spring 223.

Therefore, use of the rotary door stop 200 is described as follows:

1. Mounting of the rotary door stop 200 is assisted by the mounting assisting member 100, such that the position satisfies requirements to achieve automatic unlocking in daily use. The process of assisting positioning and mounting of the mounting assisting member 100 is as described above, and upon completion of mounting, the mounting assisting member 100 is removed.

2. During normal use, the door stop body 220 is by default in the locked state at the horizontal position, and the stop arm 22 is between the door body and the door frame to prevent closing of the door body. In this process, the buffering portion 23 acts on the door frame to achieve buffering and mutation effects.

3. When the door body needs to be closed, the door stop body 220 is rotated counterclockwise in a state where the door body is opened, such that the door stop body 220 moves upwards to a vertical position. In this case, the door stop body 220 does not stop closing of the door body, and the door stop body 220 may be retained in the unlocked state until the user closes the door body.

4. When the door body is closed, the first operating member 221 of the door stop body 220 is acted by the door frame to retract inwards, such that the limit effect between the second limiting portion 314 and the first limiting portion 214 is released.

5. When the door body is opened again, since the limit effect is released and the resetting torsion spring 223 acts, the door stop body 220 rotates clockwise relative to the door stop rotation base 210 at an angle of 90 degrees to the locked state at the horizontal position, such that subsequently automatically stopping closing of the door body is achieved.

6. Described above is an operating mode of closing the door for a single time, where the door body needs to be closed for multiple times, in the case that the door stop body 220 rotates to the unlocked state, the second operating member 222 may be operated, such that the fourth locking portion 301 and the second locking portion 211 are male-female engaged with each other to long-time lock rotation of the door stop body 220 relative to the door stop rotation base 210, that is, the rotary door stop does not function, or a constantly opened state of the rotary door stop is defined.

In other embodiments, either of the first limiting portion 214 and the second guiding portion 315 may be a guiding curved surface or a guiding planar surface.

It should be noted that the above description is given using FIG. 1 to FIG. 8 as examples, and in practice, the specific structure of the rotary door stop according to the present disclosure is not limited hereto, and some variations may be made based on the above illustration.

For example, the positions of the first operating member 221 and the second operating member 222 are exchanged (corresponding adjustments are also made to the other engaged parts). This is substantially the same as the above practice. However, only the position of the unlocked state is changed from the upward vertical direction to the downward vertical direction, which does not change the function of the product. Optionally, the first operating member 221 is adjusted from a side surface of the door stop body 220 to underneath of the door stop body 220 opposite to the stop arm 22. This may affect implementation of the automatic unlocking functions.

Optionally; the first operating member 221 and the corresponding structure thereof are canceled, and instead, the second operating member 222 and the engaged structure thereof are only remained. That is, the second operating member 222 is only remained such that the door stop body 220 is locked when rotating to the unlocked position, such that the user is capable of closing the door with no need of operating the rotary door stop. On the contrary; the case is similar, and the first operating member 221 is only remained.

These changes also achieve the effect of stopping closing of the door body. However, upon unlocking, the door body may not be automatically unlocked but needs to be manually unlocked, that is, whether the rotary door stop is capable of automatically canceling limit or lock of the locked state in closing the door. The manual unlocking may be performed after the door body is closed, which is similar to the automatic unlocking process according to the above embodiment, or the manual unlocking may be performed when the door body is opened again after being closed. These two unlocking patterns achieve substantially the same effect. However, in the first unlocking pattern, the operation is quiet and less damage is caused to the rotary door stop; while in the second unlocking pattern, the operation is performed in the state where the door is opened, and in this case, manual unlocking causes the door stop body 220 to quickly rotate to the locked position and thus cause noise and damage to the product under the effect of the resetting torsion spring 223.

In other embodiments, the rotary door stop 200 may also not provided with the first operating member 221 or the second operating member 222. In this case, where the rotary door stop needs to be closed, the door stop body 220 needs to be first rotated to the unlocked state and the door is closed in this state. After the door is closed, the door stop body 220, under the effect of the resetting torsion spring 223, the door stop body 220 may not be retained at the intention of rotating to the unlocked state but only stopped by the door frame, and when the user opens the door again, the door stop body 220 automatically rotates to the unlocked state to stop closing of the door body.

Nevertheless, in this embodiment, the rotation angle of the door stop body 220 relative to the door stop rotation base 210 is not limited to 90 degrees, which may be any angle value in the range of 90 to 270 degrees. The rotation angle may be defined according to actual needs by defining an angular relationship between the two second rotation limiting members 205.

What is claimed is:

1. A rotary door stop, comprising:

a door stop rotation base configured to be fixed to a door body or a door frame;

a door stop body rotatably engaged with the door stop rotation base, the door stop body comprising a rotation base end and a stop arm, the rotation base end being rotatably engaged onto the door stop rotation base; wherein the stop arm is configured to rotate about the door stop rotation base to between the door body and the door frame to achieve a stop effect to define a locked state, or is configured to rotate about the door stop rotation base to a non-stop position to define an unlocked state;

a rotation resetting member arranged between the door stop body and the door stop rotation base;

a first locking portion; and a first operating member provided with a third locking portion engaged with the first locking portion;

wherein one of the first locking portion and the first operating member is arranged on the door stop rotation base, and the other of the first locking portion and the first operating member is arranged on the door stop body; the first locking portion and the third locking portion are respectively provided with a first limiting portion and the second limiting portion, the first limiting portion and the second limiting portion being engaged with each other to limit rotation of the door stop body relative to the door stop rotation base, such that the door stop body is retained in the unlocked state; and wherein the first operating member is arranged close to the door frame to cause the first operating member to act on the door frame when the door body is in a closed state, so as to release limit retention between the first limiting portion and the second limiting portion, such that when the door body is opened, the door stop body is capable of automatically rotating to a lock position under the action of the rotation resetting member.

2. The rotary door stop according to claim 1, wherein the first locking portion and the third locking portion respectively comprise a first guiding portion and a second guiding portion, the first guiding portion or the second guiding portion being a guiding curved surface or a guiding planar surface; and the first limiting portion or the second limiting portion is a limiting planar surface; wherein the first guiding portion and the second guiding portion act on each other to achieve a guide effect to cause the first locking portion and the third locking portion to be engaged with each other when the door stop body rotates from the locked state to the unlocked state.

3. The rotary door stop according to claim 2, wherein the door stop rotation base and the door stop body respectively comprise a second locking portion and a second operating member, the second operating member being provided with a fourth locking portion engaged with the second locking portion, the fourth locking portion and the second locking portion being engaged with each other to limit and retain the door stop body to the unlocked state relative to the door stop rotation base, such that the rotary door stop is retained in a constantly open state.

4. The rotary door stop according to claim 3, wherein the second locking portion is a locking recess, and the fourth locking portion is a lock protrusion, the locking recess and the locking protrusion being male-female engaged with each other to limit the door stop body; and the rotation resetting member is a resetting torsion spring.

5. The rotary door stop according to claim 4, wherein the first locking portion is arranged on the door stop rotation base, and the first operating member is arranged on the door stop body; and the second locking portion is arranged on the door stop rotation base, and the second operating member is arranged on the door stop body.

6. The rotary door stop according to claim 3, wherein a rotation base slot is recessed in a bottom surface of the door stop body, the door stop rotation base being at least partially engaged into the rotation base slot; wherein the rotation base slot is provided with a first through hole and a second through hole, the first operating member and the second operating member being respectively engaged at the first through hole and the second through hole; an operation resetting member is arranged between the first operating member and the door stop body; and the door stop rotation base is provided with a first rotation limiting member arranged along a radial direction, the rotation base slot is internally provided with two second rotation limiting members, a rotation fan region being formed between the two second rotation limiting members, the first rotation limiting member being engaged in the rotation fan region;

the first operating member is displaced inwards along a direction parallel to a surface of the door body to unlock the door stop body, and the second operating member is displaced along a direction perpendicular to the surface of the door body to lock or unlock the door stop body; and the second locking portion is arranged on an upper surface of the door stop rotation base, and the second locking portion and the first locking portion are arranged at an angle of 180 or 90 degrees on the door stop base.

7. The rotary door stop according to claim 3, further comprising: a mounting assisting member removable upon completion of mounting; wherein the mounting assisting member comprises a mounting assisting member body, a mounting positioning slot, and a positioning end, the positioning end being arranged at least one end of the mounting assisting member body;

the rotation door stop is elongated, one end of the rotation door stop is formed as the rotation base end, and the other end of the rotation door stop is formed as the stop arm; a buffering portion is arranged at the stop arm; the door stop rotation base is secured to a surface of the door body by an adhesive, and the door stop body has a rotation angle of 90 degrees relative to the door stop rotation base; and the door stop body comprises a first body member and a second body member that are arranged along a vertical direction, the first body member and the second body member being engaged with each other to form the door stop body; and a second key exposed from the door stop body is formed at an outer end of the second operating member; the second operating member comprises a second operating member body, an outer end of the second operating member body being formed as a first key exposed from the door stop body, the third locking portion being protruded from a lower surface of the second operating member body.

8. A rotary door stop, comprising:

a door stop rotation base configured to be fixed to a door body or a door frame; a door stop body rotatably engaged with the door stop rotation base, the door stop body comprising a rotation base end and a stop arm, the rotation base end being rotatably engaged onto the door stop rotation base; wherein the stop arm is configured to rotate about the door stop rotation base to between the door body and the door frame to achieve a stop effect to define a locked state, or is configured to rotate about the door stop rotation base to a non-stop position to define an unlocked state;

a first locking portion; and a first operating member provided with a third locking portion engaged with the first locking portion;

wherein one of the first locking portion and the first operating member is arranged on the door stop rotation base, and the other of the first locking portion and the first operating member is arranged on the door stop body; and wherein one of the first locking portion and the third locking portion is provided with a first limiting portion, and the other of the first locking portion and the third locking portion is provided with a second limiting portion, the first limiting portion or the second limiting portion is a limiting planar surface, the first limiting portion and the second limiting portion being engaged with each other to limit rotation of the door stop body relative to the door stop rotation base, such that the door stop body is retained in the unlocked state.

9. The rotary door stop according to claim 8, wherein the first locking portion and the third locking portion respectively comprise a first guiding portion and a second guiding portion, the first guiding portion or the second guiding portion being a guiding curved surface or a guiding planar surface; wherein the first guiding portion and the second guiding portion act on each other to achieve a guide effect to cause the first locking portion and the third locking portion to be engaged with each other when the door stop body rotates from the locked state to the unlocked state; and a rotation resetting member is arranged between the door stop body and the door stop rotation base, the rotation resetting member being a resetting torsion spring.

10. The rotary door stop according to claim 9, wherein one of the door stop rotation base and the door stop body is provided with a second locking portion, and the other of the door stop rotation base and the door stop body is provided with a second operating member, the second operating member being provided with a fourth locking portion engaged with the second locking portion, the second locking portion and the fourth locking portion being respectively a locking recess and a locking protrusion, the locking recess and the locking protrusion being male-female engaged with each other to limit rotation of the door stop body relative to the door stop rotation base, such that the door stop body is retained in a unlocked state; and the first locking portion is arranged on the door stop rotation base, and the first operating member is arranged on the door stop body; and the second locking portion is arranged on the door stop rotation base, and the second operating member is arranged on the door stop body.

11. The rotary door stop according to claim 10, wherein a rotation base slot is recessed in a bottom surface of the door stop body, the door stop rotation base being at least partially engaged into the rotation base slot; wherein the rotation base slot is provided with a first through hole and a second through hole, the first operating member and the second operating member being respectively engaged at the first through hole and the second through hole; an operation resetting member is arranged between the first operating member and the door stop body;

the door stop rotation base comprises a rotation base slot that is recessed and a rotation base slot wall that surrounds the rotation base slot, the first locking portion being arranged in the rotation base slot and adjacent to the rotation base slot wall, the third locking portion being engaged into the rotation base slot and moving along the rotation base slot wall or the first locking portion; and the first operating member is displaced inwards along a direction parallel to a surface of the door body to unlock the door stop body, and the second operating member is displaced along a direction perpendicular to the surface of the door body to lock or unlock the door stop body; and the door stop rotation base is provided with a first rotation limiting member arranged along a radial direction, the rotation base slot is internally provided with two second rotation limiting members, a rotation fan region being formed between the two second rotation limiting members, the first rotation limiting member being engaged in the rotation fan region;

the second locking portion is arranged on an upper surface of the door stop rotation base, and the second locking portion and the first locking portion are arranged at an angle of 180 or 90 degrees on the door stop base.

12. The rotary door stop according to claim 10, further comprising: a mounting assisting member; wherein the mounting assisting member comprises a mounting assisting member body and a mounting positioning slot, and the mounting assisting member is removable upon completion of mounting;

the rotation door stop is elongated, one end of the rotation door stop is formed as the rotation base end, and the other end of the rotation door stop is formed as the stop arm; a buffering portion is arranged at the stop arm; the door stop rotation base is secured to a surface of the door body by an adhesive; and the door stop body comprises a first body member and a second body member that are arranged along a vertical direction, the first body member and the second body member being engaged with each other to form the door stop body; and a second key exposed from the door stop body is formed at an outer end of the second operating member; the second operating member comprises a second operating member body, an outer end of the second operating member body being formed as a first key exposed from the door stop body, the third locking portion being protruded from a lower surface of the second operating member body.

* * * * *